United States Patent
Youm

(10) Patent No.: US 10,416,880 B2
(45) Date of Patent: Sep. 17, 2019

(54) TOUCH INPUT METHOD FOR MOBILE DEVICE, MOBILE DEVICE, AND COMPUTER PROGRAM

(71) Applicant: XOGAMES INC., Seongnam-si, Gyeonggi-do (KR)

(72) Inventor: Eui Joon Youm, Seongnam-si (KR)

(73) Assignee: XOGAMES INC., Seongnam-si, Gyeonggi-Do (KR)

( * ) Notice: Subject to any disclaimer, the term of this patent is extended or adjusted under 35 U.S.C. 154(b) by 0 days.

(21) Appl. No.: 15/772,875

(22) PCT Filed: Nov. 2, 2016

(86) PCT No.: PCT/KR2016/012518
§ 371 (c)(1),
(2) Date: May 2, 2018

(87) PCT Pub. No.: WO2017/078398
PCT Pub. Date: May 11, 2017

(65) Prior Publication Data
US 2018/0321839 A1    Nov. 8, 2018

(30) Foreign Application Priority Data
Nov. 2, 2015  (KR) .................. 10-2015-0153422

(51) Int. Cl.
*G06F 3/0488*   (2013.01)
*G06F 3/041*    (2006.01)
*G06K 9/00*     (2006.01)

(52) U.S. Cl.
CPC ........ *G06F 3/04883* (2013.01); *G06F 3/0416* (2013.01); *G06K 9/0002* (2013.01);
(Continued)

(58) Field of Classification Search
None
See application file for complete search history.

(56) References Cited

U.S. PATENT DOCUMENTS

2013/0207920 A1*  8/2013  McCann ............... G06F 3/0488
                                                    345/173
2014/0035876 A1*  2/2014  Huang ................ G06F 3/04883
                                                    345/175
(Continued)

FOREIGN PATENT DOCUMENTS

KR   1020090101741 A   9/2009
KR   1020110049589 A   5/2011
(Continued)

OTHER PUBLICATIONS

International Search Report for PCT/KR2016/012518 dated Mar. 16, 2017, 2 pages.

*Primary Examiner* — Nicholas J Lee
(74) *Attorney, Agent, or Firm* — Hamre, Schumann, Mueller & Larson, P.C.

(57) ABSTRACT

A touch input method for a mobile device includes receiving a first touch input as an input of a first finger which is a reference finger, receiving a second touch input of a second finger with elapse of a predetermined time after receiving the first touch input, calculating a relative displacement of the second touch input with respect to the first touch input on the basis of a position of the first touch input and a position of the second touch input, identifying the second finger used for the second touch input on the basis of the relative displacement, determining whether a pattern associated with the first touch input of the first finger and the second touch input of the identified second finger corresponds to a previously stored pattern, correcting the position of the second touch input of the second finger on the basis of a position of the second finger defined in the previously stored pattern when the pattern corresponds to the previously stored pattern, and performing an operation corre-
(Continued)

sponding to the first touch input and the corrected second touch input among previously stored multiple operations.

17 Claims, 6 Drawing Sheets

(52) U.S. Cl.
CPC ............... *G06K 9/00335* (2013.01); *G06F 2203/04104* (2013.01); *G06F 2203/04808* (2013.01)

(56) References Cited

U.S. PATENT DOCUMENTS

| | | | | |
|---|---|---|---|---|
| 2014/0298266 | A1* | 10/2014 | Lapp | G06F 3/04886 715/835 |
| 2015/0100910 | A1* | 4/2015 | Luo | G06F 3/04883 715/771 |

FOREIGN PATENT DOCUMENTS

| | | |
|---|---|---|
| KR | 1020110092554 A | 8/2011 |
| KR | 1020130129914 A | 11/2013 |
| KR | 1020150060476 A | 6/2015 |

\* cited by examiner

TOUCH INPUT METHOD FOR MOBILE DEVICE, MOBILE DEVICE, AND COMPUTER PROGRAM

TECHNICAL FIELD

The present disclosure relates to a touch input method for a mobile device, a mobile device, and a computer program.

BACKGROUND

Conventionally, representative input methods for desktop, mobile phone, etc. have used a keyboard, a mouse, a track ball, and a joystick. However, in recent years, a touch screen has been mainly used as an easy-to-use and intuitive interface. The touch screen is installed in most of the modern smart devices such as smartphones and has been widely applied in real life such as automatic teller machines and kiosks installed in public places.

Meanwhile, users often use their smartphone on the move or in an unstable environment. Therefore, in this case, a touch input is very inaccurate.

Most of the touch input methods use an absolute coordinate system and require a user to touch a specific position on a screen at a specific time assuming that the user uses the same finger to perform the same operation.

This is caused by limitations in an input method using a mouse and a resistive touch screen system which are widely used in a static environment and thus is not optimal for current smart devices, most of which are equipped with a capacitive touch screen system.

The absolute coordinate system may be suitable for a normal application which does not require a large number of touch inputs but may cause a considerable number of errors in a game which requires a large number of touch inputs. Further, a finger has a relatively larger area than a touch screen, and, thus, a large number of errors may occur according to the absolute coordinate system.

Due to the problems about the touch input methods, there are many limitations in the production of contents.

In this regard, Korean Patent Laid-open Publication No. 2014-0097358 relates to an operation device and describes an absolute coordinate mode and a relative coordinate mode.

DISCLOSURE OF THE INVENTION

Problems to be Solved by the Invention

The present disclosure provides a method of calculating a relative displacement of each touch input and identifying a finger used for touch input on the basis of the relative displacement of each touch input, a mobile device, and a computer program.

The present disclosure also provides a method of correcting a position of each touch input using a relative coordinate system instead of an absolute coordinate system and performing an operation corresponding to a touch input with an identified finger, and a mobile device and a computer program. However, problems to be solved by the present disclosure are not limited to the above-described problems. There may be other problems to be solved by the present disclosure.

Means for Solving the Problems

As means for solving the problems, an exemplary embodiment of the present disclosure provides a touch input method for a mobile device, comprising receiving a first touch input as an input of a first finger which is a reference finger, receiving a second touch input of a second finger after a predetermined time from a time of receiving the first touch input, calculating a relative displacement of the second touch input with respect to the first touch input on the basis of a position of the first touch input and a position of the second touch input, identifying the second finger used for the second touch input on the basis of the relative displacement, determining whether a pattern associated with the first touch input of the first finger and the second touch input of the identified second finger corresponds to a previously stored pattern, correcting the position of the second touch input of the second finger on the basis of a position of the second finger defined in the previously stored pattern when the pattern corresponds to the previously stored pattern, and performing an operation corresponding to the first touch input and the corrected second touch input among previously stored multiple operations.

Another exemplary embodiment of the present disclosure provides a mobile device, comprising a touch input receiving unit configured to receive a first touch input as an input of a first finger which is a reference finger and receive a second touch input of a second finger after a predetermined time from a time of receiving the first touch input, a touch input analyzing unit configured to calculate a relative displacement of the second touch input with respect to the first touch input on the basis of a position of the first touch input and a position of the second touch input, a finger identifying unit configured to identify the second finger used for the second touch input on the basis of the relative displacement, a pattern analyzing unit configured to determine whether a pattern associated with the first touch input of the first finger and the second touch input of the identified second finger corresponds to a previously stored pattern, a touch input position correcting unit configured to correct the position of the second touch input of the second finger on the basis of a position of the second finger defined in the previously stored pattern when the pattern corresponds to the previously stored pattern, and an output unit configured to perform an operation corresponding to the first touch input and the corrected second touch input among previously stored multiple operations.

Yet another exemplary embodiment of the present disclosure provides a computer program stored in a medium that is linked to a computing device and configured to identify a touch input, wherein when the computer program is executed by the computing device, the computer program stored in the medium including a sequence of commands enables receiving a first touch input as an input of a first finger which is a reference finger, receiving a second touch input of a second finger after a predetermined time from a time of receiving the first touch input, calculating a relative displacement of the second touch input with respect to the first touch input on the basis of a position of the first touch input and a position of the second touch input, identifying the second finger used for the second touch input on the basis of the relative displacement, determining whether a pattern associated with the first touch input of the first finger and the second touch input of the identified second finger corresponds to a previously stored pattern, correcting the position of the second touch input of the second finger on the basis of a position of the second finger defined in the previously stored pattern when the pattern corresponds to the previously stored pattern, and performing an operation corresponding to the first touch input and the corrected second touch input among previously stored multiple operations.

Effects of the Invention

According to any one of the above-described exemplary embodiments of the present disclosure, it is possible to provide a method of calculating a relative displacement of each touch input and identifying a finger used for touch input on the basis of the relative displacement of each touch input, a mobile device, and a computer program.

Further, it is possible to provide a method of correcting a position of each touch input using a relative coordinate system instead of an absolute coordinate system and performing an operation corresponding to a touch input with an identified finger, and a mobile device and a computer program. However, problems to be solved by the present disclosure are not limited to the above-described problems.

BEST MODE FOR CARRYING OUT THE INVENTION

Figure 1:
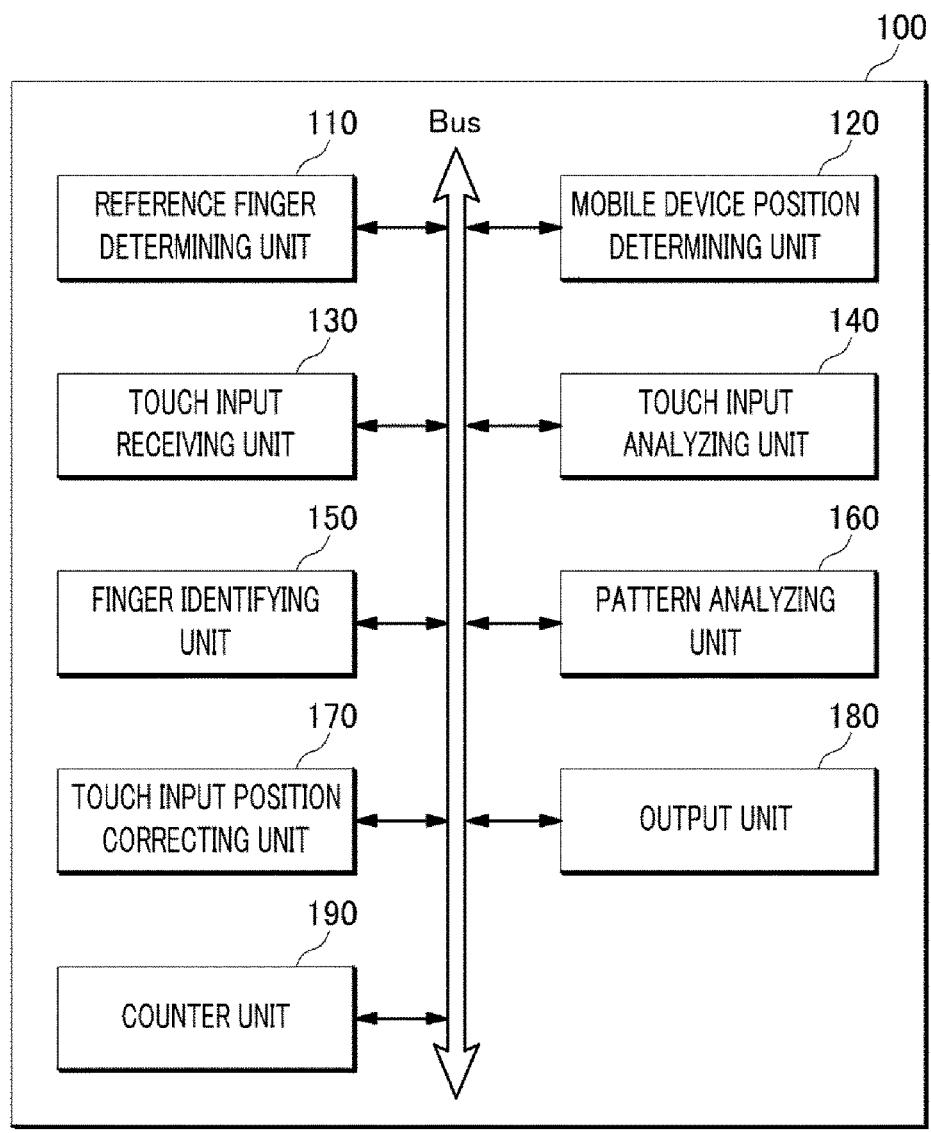
FIG. 1 is a block diagram of a mobile device according to an embodiment of the present disclosure.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, it is to be understood that the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "unit" includes a unit implemented by hardware, a unit implemented by software, and a unit implemented by both of them. One unit may be implemented by two or more pieces of hardware, and two or more units may be implemented by one piece of hardware.

Through the whole document, a part of an operation or function described as being carried out by a terminal or device may be carried out by a server connected to the terminal or device. Likewise, a part of an operation or function described as being carried out by a server may be carried out by a terminal or device connected to the server.

Hereinafter, an exemplary embodiment of the present disclosure will be described in detail with reference to the accompanying configuration views or process flowcharts.

FIG. 1 is a block diagram of a mobile device according to an embodiment of the present disclosure. Referring to FIG. 1, a mobile device 100 may include a reference finger determining unit 110, a mobile device position determining unit 120, a touch input receiving unit 130, a touch input analyzing unit 140, a finger identifying unit 150, a pattern analyzing unit 160, a touch input position correcting unit 170, an output unit 180, and a counter unit 190.

The reference finger determining unit 110 may determine a reference finger. As the reference finger, a reference finger previously determined by the reference finger determining unit 110 according to an application may be guided before a first touch input. For example, before a touch input, a sentence such as "Touch with the index finger first" may be displayed or output in voice mode.

Alternatively, the reference finger may be selected by a user. The reference finger determining unit 110 may determine a finger selected by the user as the reference finger. For example, the user may access a setting menu of the application to select or change the reference finger.

The reference finger determining unit 110 may identify the reference finger by analyzing information about the first touch input. The reference finger determining unit 110 may identify the reference finger on the basis of at least one of a position of the first touch input, a shape of the first touch input, and an area of the first touch input.

For example, if the first touch input occurs at a position away from the center of a touch screen to the left and the area of the touch input is greater than that of a previously stored touch input, the reference finger determining unit 110 may identify a thumb as the reference finger.

Further, if the first touch input occurs at a position away from the center of the touch screen to the right and the area of the touch input is smaller than that of the previously stored touch input, the reference finger determining unit 110 may identify a little finger as the reference finger.

Furthermore, if the first touch input occurs at a position near the center of the touch screen and the area of the touch input is similar to that of the previously stored touch input, e.g., if a difference in area between the first touch input and the previously stored touch input is equal to or less than a predetermined value, the reference finger determining unit 110 may identify one of an index finger, a middle finger, and a ring finger as the reference finger.

If the reference finger determining unit 110 identifies one of an index finger, a middle finger, and a ring finger as the reference finger, the reference finger determining unit 110 may determine the reference finger on the basis of previously stored priorities. For example, the priorities may be previously stored in order of the index finger, the middle finger, and the ring finger.

Even after the application is executed, the reference finger determining unit 110 may change the reference finger. For example, the reference finger determining unit 110 may receive one of previously stored multiple touch inputs and determine a reference finger on the basis of the received touch input.

For example, a touch input using the thumb as a reference finger, a touch input using the index finger as a reference finger, a touch input using the middle finger as a reference finger, a touch input using the ring finger as a reference finger, and a touch input using the little finger as a reference finger may be previously stored, and the reference finger determining unit 110 may determine a reference finger on the basis of the received touch input.

Further, the reference finger determining unit 110 may include the mobile device position determining unit 120 configured to identify the use environment of the mobile device (i.e., whether the user is using the mobile device in his/her hand or on a table) and which hand (left hand or right hand) makes the first touch input on the basis of at least one of a rotation angle of the mobile device, the position of the first touch input, the shape of the first touch input, and a relative positional relationship among multiple touch inputs.

For example, the mobile device position determining unit 120 may determine whether the mobile device user is using the mobile device in his/her hand or on a table on the basis of the rotation angle of the mobile device. For example, if the mobile device position determining unit 120 determines that the mobile device is lying flat on the basis of the rotation angle of the mobile device, the mobile device position determining unit 120 may determine that the user is using the mobile device on a table. For another example, if the mobile device position determining unit 120 determines that the mobile device is being used at a certain angle (e.g., 30° to 70°) on the basis of the rotation angle of the mobile device, the mobile device position determining unit 120 may determine that the user is using the mobile device in his/her hand.

If the mobile device position determining unit 120 determines that the mobile device user is using the mobile device in his/her hand, the mobile device position determining unit 120 may identify which hand makes the first touch input (i.e., which hand holds the mobile device) on the basis of at least one of the rotation angle of the mobile device, the shape of the first touch input, and the relative positional relationship among multiple touch inputs.

For example, if the mobile device is slanted toward the left when the first touch input occurs, the mobile device position determining unit 120 may determine that the user holds the mobile device in his/her right hand (i.e., the user makes the first touch input with his/her left hand). For another example, if the mobile device is slanted toward the right when the first touch input occurs, the mobile device position determining unit 120 may determine that the user holds the mobile device in his/her left hand (i.e., the user makes the first touch input with his/her right hand).

Further, if the mobile device position determining unit 120 determines that the mobile device user is using the mobile device on a table, the mobile device position determining unit 120 may identify which hand makes the first touch input on the basis of at least one of the shape of the first touch input and the relative positional relationship among multiple touch inputs except the rotation angle of the mobile device.

The mobile device position determining unit 120 may identify which hand makes the first touch input (i.e., which hand holds the mobile device) on the basis of a first weighting based on the rotation angle of the mobile device, a second weighting based on the shape of the first touch input, and a third weighting based on the relative positional relationship among multiple touch inputs.

For example, if the mobile device is slanted toward the left when the first touch input occurs, the mobile device position determining unit 120 may give a weighting to the left hand, and if the mobile device is slanted toward the right when the first touch input occurs, the mobile device position determining unit 120 may give a weighting to the right hand.

For another example, the mobile device position determining unit 120 may give a weighting to the left hand or right hand on the basis of the shape of the first touch input. For example, in the case where the index finger is previously set as a reference finger, if the shape of the first touch input is similar to the shape of the waning moon (left half-moon) or convex to the left, the mobile device position determining unit 120 may give a weighting to the left hand and if the shape of the first touch input is similar to the shape of the waxing moon (right half-moon) or convex to the right, the mobile device position determining unit 120 may give a weighting to the right hand. Further, in the case where the thumb is previously set as a reference finger, if the shape of the first touch input is similar to the shape of the waning moon, the mobile device position determining unit 120 may give a weighting to the right hand and if the shape of the first touch input is similar to the shape of the waxing moon, the mobile device position determining unit 120 may give a weighting to the left hand.

Furthermore, the mobile device position determining unit 120 may identify whether the mobile device user is using the mobile device held widthwise or lengthwise in his/her hand on the basis of the rotation angle of the mobile device.

If it is determined that the mobile device user is using the mobile device held widthwise in his/her hand, the mobile device position determining unit 120 may identify which hand makes the first touch input in further consideration of the position of the first touch input. For example, if the first touch input occurs at a position on the left from the center of the mobile device, the mobile device position determining unit 120 may give a weighting to the left hand and if the first touch input occurs at a position on the right from the center of the mobile device, the mobile device position determining unit 120 may give a weighting to the right hand.

The mobile device position determining unit 120 may identify which hand makes the first touch input by summing up weightings of the rotation angle of the mobile device, the position of the first touch input, the shape of the first touch input, and the relative positional relationship among multiple touch inputs, respectively.

The mobile device position determining unit 120 may periodically monitor the use environment of the mobile device using an acceleration sensor or a gyro sensor of the mobile device. For example, the mobile device position determining unit 120 may determine whether the user is using the mobile device on the move, on public transportation, or on a table on the basis of the level of vibrations of the mobile device.

The touch input receiving unit 130 may receive a first touch input as an input of a first finger which is a reference finger. Herein, the touch input receiving unit 130 may assume that the first touch input is made with a reference finger, e.g., the index finger.

The touch input receiving unit 130 may receive a second touch input. Herein, the first touch input and the second touch input may occur at a predetermined time interval or simultaneously.

The touch input analyzing unit 140 may calculate a relative displacement (or relative positional difference) between the first touch input and the second touch input on the basis of the position of the first touch input and a position of the second touch input. For example, the relative displacement may be a difference in direction and distance between the position of the first touch input and the position of the second touch input. Otherwise, the relative displacement may be a difference in x and y values between the position of the first touch input and the position of the second touch input.

For example, the touch input analyzing unit 140 may extract coordinate values of the first touch input and coordinate values of the second touch input and calculate a direction of the position of the second touch input from the position of the first touch input and a difference in coordinate values between the first touch input and the second touch input on the basis of the coordinate values of the first touch input and the coordinate values of the second touch input.

The finger identifying unit 150 may identify a second finger used for the second touch input on the basis of the relative displacement of the second touch input with respect to the first touch input.

If multiple touch inputs occur, the finger identifying unit 150 may identify the respective fingers used for the touch inputs in consideration of relative displacements of all the touch inputs.

If the relative displacement of the second touch input with respect to the first touch input is equal to or smaller than a predetermined value, the finger identifying unit 150 may determine that the second finger is the same as the first finger. Further, if the relative displacement of the second touch input with respect to the first touch input is equal to or greater than the predetermined value, the finger identifying unit 150 may determine that the second finger is different from the first finger.

For example, the finger identifying unit 150 may determine whether a difference in coordinate values between the first touch input and the second touch input is equal to or smaller than a predetermined value, and if it is equal to or smaller than the predetermined value, the finger identifying unit 150 may determine that the second finger is the same as the first finger.

Otherwise, if the difference in coordinate values between the first touch input and the second touch input is equal to or greater than the predetermined value, the finger identifying unit 150 may determine that the second finger is different from the first finger. In this case, the finger identifying unit 150 may determine which finger corresponds to the second finger on the basis of the direction of the position of the second touch input from the position of the first touch input and the difference in coordinate values between the first touch input and the second touch input.

The pattern analyzing unit 160 may determine whether a pattern associated with the first touch input of the first finger and the second touch input of the identified second finger corresponds to a previously stored pattern. The previously stored pattern may include information about which hand holds the mobile device, information about whether it is a single touch, information about whether they are multiple touches, and information about whether the multiple touches occur at a predetermined time interval or simultaneously. For example, the previously stored pattern may be a frequently used pattern and may include multiple patterns for changing from a touch input using any one finger to a touch input using another finger in a single touch operation and multiple patterns of multiple touch inputs using at least one finger at the same time. The previously stored patterns may vary depending on an application. Further, the multiple patterns may vary depending on which hand makes a touch input (e.g., a pattern associated with touch inputs using the right index finger and middle finger is different from a pattern associated with touch inputs using the left index finger and middle finger).

The touch input position correcting unit 170 may correct the position of the second touch input on the basis of the use environment of the mobile device (i.e., whether the user is using the mobile device in his/her hand or on a table) and information about a hand manipulating the mobile device (i.e., information about which hand holds the mobile device).

For example, if the user is using the mobile device on a table, the touch input position correcting unit 170 may not correct the position of the second touch input. This is because if the user is using the mobile device on a table, the user is highly likely to accurately perform a touch input. Otherwise, if the user is using the mobile device in his/her hand, the touch input position correcting unit 170 may correct the position of the second touch input as described below.

If a pattern associated with the first touch input of the first finger and the second touch input of the identified second finger corresponds to the previously stored pattern, the touch input position correcting unit 170 may correct the position of the second touch input of the second finger on the basis of a position of the second finger defined in the previously stored pattern.

The output unit 180 may perform an operation corresponding to the touch inputs of the first finger and the identified second finger among previously stored multiple operations. The previously stored multiple operations may include multiple operations corresponding to a change from a touch input using any one finger to a touch input using another finger in a single touch operation and multiple operations corresponding to a touch input using at least one finger at the same time in a multi-touch operation.

The previously stored multiple operations may vary depending on an application. For example, in a drawing application, touch inputs using the respective fingers may represent different colors or different tools. Further, in a piano application, single touches or multiple touches using the respective fingers may be matched with chords.

Further, if it is determined that the second finger is the same as the first finger, the output unit 180 may correct the position of the second touch input on the basis of the position of the first touch input.

For example, in the case where it is determined that the second finger is the same as the first finger, it is possible to correct the coordinate values of the second touch input to be identical or similar to those of the first touch input even if the second touch input is somewhat different from the first touch input in coordinate values. By correcting the position of the second touch input, when the first finger consecutively touches the same range, it is possible to suppress an input into a different range.

Further, if it is determined that the second finger is different from the first finger, the output unit 180 may correct the position of the second touch input on the basis of the previously stored patterns. For example, if a pattern associated with the first touch input of the first finger and the second touch input of the second finger is included in the previously stored patterns, it is possible to correct the position of the second touch input to be identical or similar to a position defined in the patterns even if a position of the second finger is slightly deviated from a position defined in the patterns.

The output unit 180 may provide feedback about the touch inputs of the first finger and the identified second finger. For example, the feedback may include at least one of sound feedback, visual feedback, and vibration feedback.

The counter unit 190 may check whether a predetermined time has elapsed after a last touch input. For example, the counter unit 190 may check whether a predetermined time has elapsed after the second touch input.

If the predetermined time has elapsed, the touch input receiving unit 130 may receive a touch input made after the elapse of the predetermined time as an input of the first finger which is the reference finger.

The following description is based on the assumption that the predetermined time has not been elapsed.

The touch input receiving unit 130 may receive a third touch input. Herein, the first touch input, the second touch input, and the third touch input may occur at a predetermined time interval or simultaneously.

The touch input analyzing unit 140 may calculate a relative displacement of the third touch input with respect to the first touch input and a relative displacement of the third touch input with respect to the second touch input on the basis of the position of the first touch input, the position of the second touch input, and a position of the third touch input. Herein, the relative displacement may be a difference in direction and distance between the position of the first touch input and the position of the third touch input and a difference in direction and distance between the position of the second touch input and the position of the third touch input.

For example, the touch input analyzing unit 140 may extract coordinate values of the first touch input, coordinate values of the second touch input, and coordinate values of the third touch input and calculate a direction of the position of the third touch input from the position of the first touch input and a difference in coordinate values between the first touch input and the third touch input and a direction of the position of the third touch input from the position of the second touch input and a difference in coordinate values between the second touch input and the third touch input on the basis of the coordinate values of the first touch input, the coordinate values of the second touch input, and the coordinate values of the third touch input.

If multiple touch inputs occur, the finger identifying unit 150 may identify fingers used for the respective touch inputs in consideration of relative displacements of the respective touch inputs.

For example, the finger identifying unit 150 may identify a second finger used for the second touch input on the basis of the relative displacement of the third touch input with respect to the first touch input and the relative displacement of the third touch input with respect to the second touch input.

If the relative displacement of the third touch input with respect to the first touch input is equal to or smaller than a predetermined value, the finger identifying unit 150 may determine that a third finger is the same as the first finger. Further, if the relative displacement of the third touch input with respect to the second touch input is equal to or smaller than the predetermined value, the finger identifying unit 150 may determine that the third finger is the same as the second finger. Furthermore, if the relative displacement of the third touch input with respect to the second touch input is equal to or greater than the predetermined value, the finger identifying unit 150 may determine that the third finger is different from the second finger.

For example, the finger identifying unit 150 may determine whether a difference in coordinate values between the first touch input and the third touch input and a difference in coordinate values between the second touch input and the third touch input are equal to or smaller than a predetermined value, and if they are equal to or smaller than the predetermined value, the finger identifying unit 150 may determine that the third finger is the same as the first finger or the second finger.

Otherwise, if the difference in coordinate values between the first touch input and the third touch input and the difference in coordinate values between the second touch input and the third touch input are equal to or greater than the predetermined value, the finger identifying unit 150 may determine that the third finger is different from the first finger or the second finger. In this case, the finger identifying unit 150 may determine which finger corresponds to the third finger on the basis of the direction of the position of the third touch input from the position of the first touch input, the difference in coordinate values between the first touch input and the third touch input, the direction of the position of the third touch input from the position of the second touch input, the difference in coordinate values between the second touch input and the third touch input.

The pattern analyzing unit 160 may determine whether a pattern associated with the first touch input of the first finger, the second touch input of the identified second finger, and the third touch input of the identified third finger corresponds to a previously stored pattern.

The touch input position correcting unit 170 may correct the position of the third touch input on the basis of the use environment of the mobile device (i.e., whether the user is using the mobile device in his/her hand or on a table) and information about a hand manipulating the mobile device (i.e., information about which hand holds the mobile device).

If a pattern associated with the first touch input of the first finger, the second touch input of the identified second finger, and the third touch input of the identified third touch input corresponds to the previously stored pattern, the touch input position correcting unit 170 may correct the position of the third touch input of the third finger on the basis of a position of the second finger defined in the previously stored patterns.

The output unit 180 may perform an operation corresponding to the touch inputs of the first finger, the second finger, and the identified third finger among previously stored multiple operations. The previously stored multiple operations may include multiple operations corresponding to a change from a touch input using any one finger to a touch input using another finger in a single touch operation and multiple operations corresponding to a touch input using at least one finger at the same time in a multi-touch operation.

The previously stored multiple operations may vary depending on an application. For example, in a drawing application, touch inputs using the respective fingers may represent different colors or different tools. Further, in a piano application, single touches or multiple touches using the respective fingers may be matched with well-known chords.

Further, if it is determined that the third finger is the same as the first finger, the output unit 180 may correct the position of the third touch input on the basis of the position of the first touch input.

For example, in the case where it is determined that the third finger is the same as the first finger, the output unit 180 may correct the coordinate values of the third touch input to be identical or similar to those of the first touch input even if the third touch input is somewhat different from the first touch input in coordinate values.

Furthermore, if it is determined that the third finger is the same as the second finger, the output unit 180 may correct the position of the third touch input on the basis of the position of the second touch input.

For example, in the case where it is determined that the third finger is the same as the second finger, the output unit 180 may correct the coordinate values of the third touch input to be identical or similar to those of the second touch input even if the third touch input is somewhat different from the second touch input in coordinate values.

By correcting the position of the third touch input, when the first finger or the second finger consecutively touches the same range, it is possible to suppress an input into a different range.

Further, if it is determined that the third finger is different from the first finger and the second finger, the output unit 180 may correct the position of the third touch input on the basis of previously stored patterns. For example, the previously stored patterns may be frequently used patterns and may include multiple patterns for changing from a touch input using any one finger to a touch input using another finger in a single touch operation and multiple patterns of multiple touch inputs using at least one finger at the same time. The previously stored patterns may vary depending on an application.

For example, if a pattern associated with the first touch input of the first finger, the second touch input of the second finger, and the third touch input of the third finger is included in the previously stored patterns, the it is possible to correct the position of the third touch input to be identical or similar to a position defined in the patterns even if a position of the third finger is slightly deviated from a position defined in the patterns.

Figure 2:
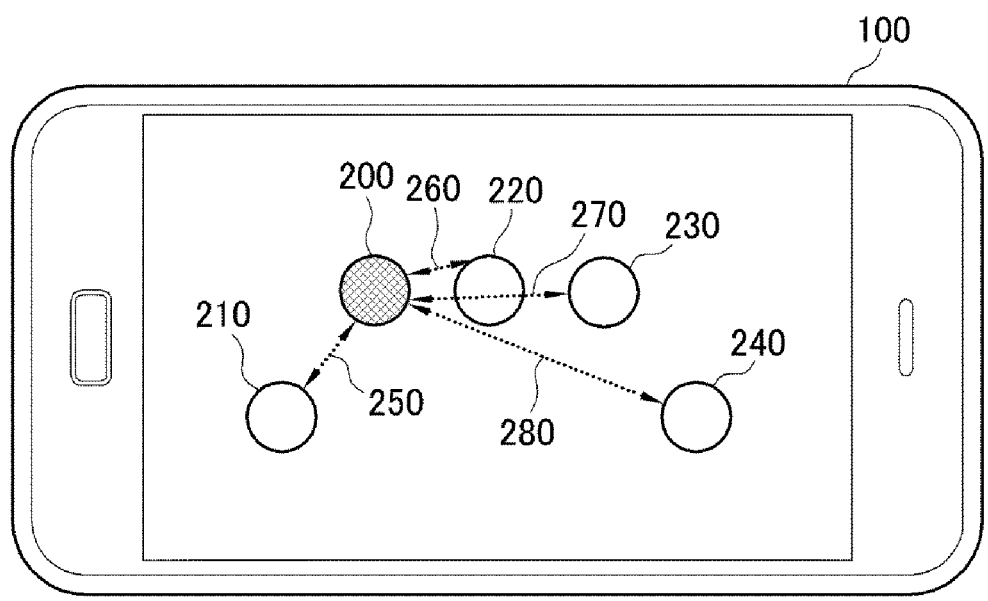
FIG. 2 is a diagram provided to explain a method of identifying a second finger according to an embodiment of the present disclosure.

FIG. 2 is a diagram provided to explain a method of identifying a second finger according to an embodiment of the present disclosure. Referring to FIG. 2, the mobile device 100 may identify a second finger used for a second touch input on the basis of a relative displacement of the second touch input with respect to a first touch input.

If the relative displacement of the second touch input with respect to the first touch input 200 is equal to or smaller than a predetermined value, the mobile device 100 may determine that a second finger 210 is the same as a first finger 200. Further, if the relative displacement of the second touch input with respect to the first touch input is equal to or greater than the predetermined value, the mobile device 100 may determine that the second finger is different from the first finger.

For example, in the case where the first finger 200 as a reference finger is an index finger, if a second finger 210 is on the lower left side of the first finger 200 and a difference 250 in coordinate values between the first touch input and the second touch input is within a first range, the second finger 210 may be determined as a thumb. For example, the first range may be about 2 cm or more.

Further, if a second finger 220 is on the right side of the first finger 200 and a difference 260 in coordinate values between the first touch input and the second touch input is within a second range, the second finger 220 may be determined as a middle finger. For example, the second range may be from about 1 cm to about 2 cm.

Furthermore, if a second finger 230 is on the right side of the first finger 200 and a difference 270 in coordinate values between the first touch input and the second touch input is within a third range, the second finger 230 may be determined as a ring finger. For example, the third range may be from about 2 cm to about 3 cm.

Moreover, if a second finger 240 is on the lower right side of the first finger 200 and a difference 280 in coordinate values between the first touch input and the second touch input is within a fourth range, the second finger 240 may be determined as a little finger. For example, the fourth range may be about 3 cm or more.

FIG. 3 is a diagram provided to explain a method of identifying a third finger according to an embodiment of the present disclosure.

If multiple touch inputs occur, the mobile device 100 may identify the fingers used for the respective touch inputs in consideration of relative displacements of the respective touch inputs.

Figure 3A:
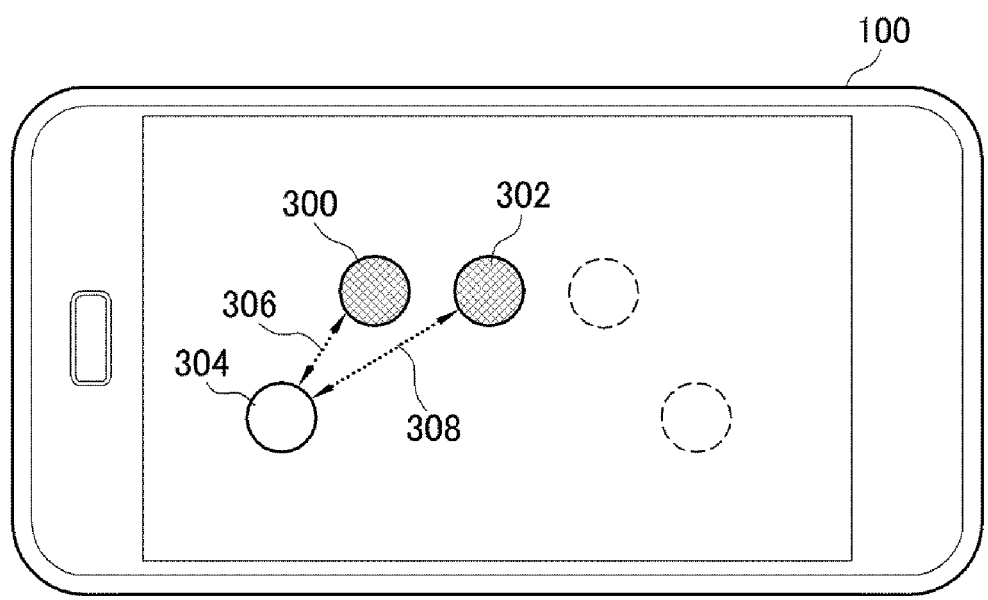
FIG. 3 is a diagram provided to explain a method of identifying a third finger according to an embodiment of the present disclosure.

Referring to FIG. 3A, in the case where a first finger 300 as a reference finger is an index finger and a second finger 302 is a middle finger, if a third finger 304 is on the lower left side of the first finger 300 and the third finger 304 is on the lower left side of the second finger 302 and a difference 306 in coordinate values between a first touch input and a third touch input is within a first range and a difference 308 in coordinate values between a second touch input and the third touch input is within a second range, the third finger 304 may be determined as a thumb. In this case, the first range may be about 2 cm or more and the second range may be about 3 cm or more.

Figure 3B:
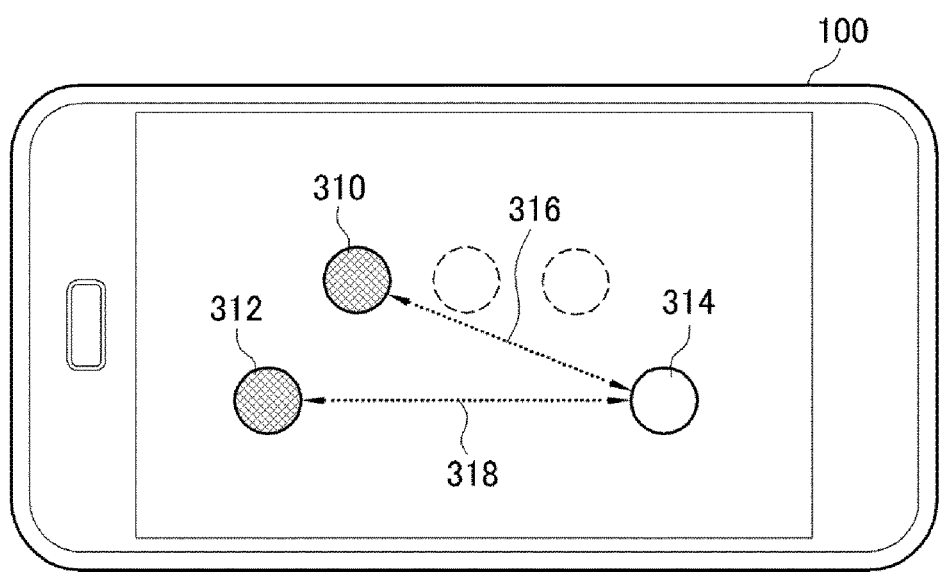

Referring to FIG. 3B, in the case where a first finger 310 as a reference finger is an index finger and a second finger 312 is a middle finger, if a third finger 314 is on the lower right side of the first finger 310 and the third finger 314 is on the right side of the second finger 312 and a difference 316 in coordinate values between a first touch input and a third touch input is within a third range and a difference 318 in coordinate values between a second touch input and the third touch input is within a fourth range, the third finger 314 may be determined as a little finger. In this case, the third range may be from about 2 cm to about 3 cm and the fourth range may be about 4 cm or more.

Figure 4:
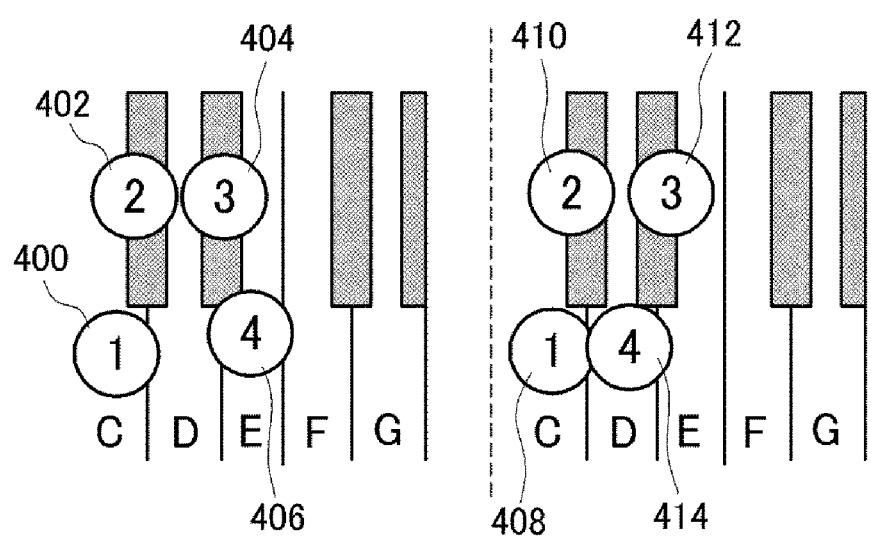
FIG. 4 is a diagram provided to explain a method of correcting a position of a touch input according to an embodiment of the present disclosure.

FIG. 4 is a diagram provided to explain a method of correcting a position of a touch input according to an embodiment of the present disclosure. Hereinafter, a method of correcting a position of a touch input in a piano application will be described for convenience in explanation, but the present disclosure is not limited thereto.

The mobile device 100 may correct a position of each touch input on the basis of previously stored patterns.

For example, the previously stored patterns may be frequently used patterns and may include multiple patterns for changing from a touch input using any one finger to a touch input using another finger in a single touch operation and multiple patterns of multiple touch inputs using at least one finger at the same time. The previously stored patterns may vary depending on an application.

Referring to FIG. 4, as a previously stored pattern, sequential or simultaneous inputs of a thumb 400 for the C chord, an index finger 402 for the C# chord, a middle finger 404 for the D# chord, and a ring finger 406 for the E chord may be previously stored.

In this case, the mobile device 100 may identify a finger input for the C chord as the thumb 408, a finger input for the C# chord as the index finger 410, a finger input for the D# chord as the middle finger 412, and a finger input for the D chord as the ring finger 414.

In this case, the mobile device 100 may correct a position of a touch input for the D chord on the basis of the previously stored patterns. For example, even if a position of a touch input made for the D chord is currently right for the D chord, the mobile device 100 may determine the touch input as an error in the range of a touch input and then correct the touch input to an input for the E chord. Therefore, even if a position of a finger is slightly deviated from a position defined in the patterns, it is possible to correct a position of a touch input to be identical or similar to a position defined in the patterns.

Figure 5:
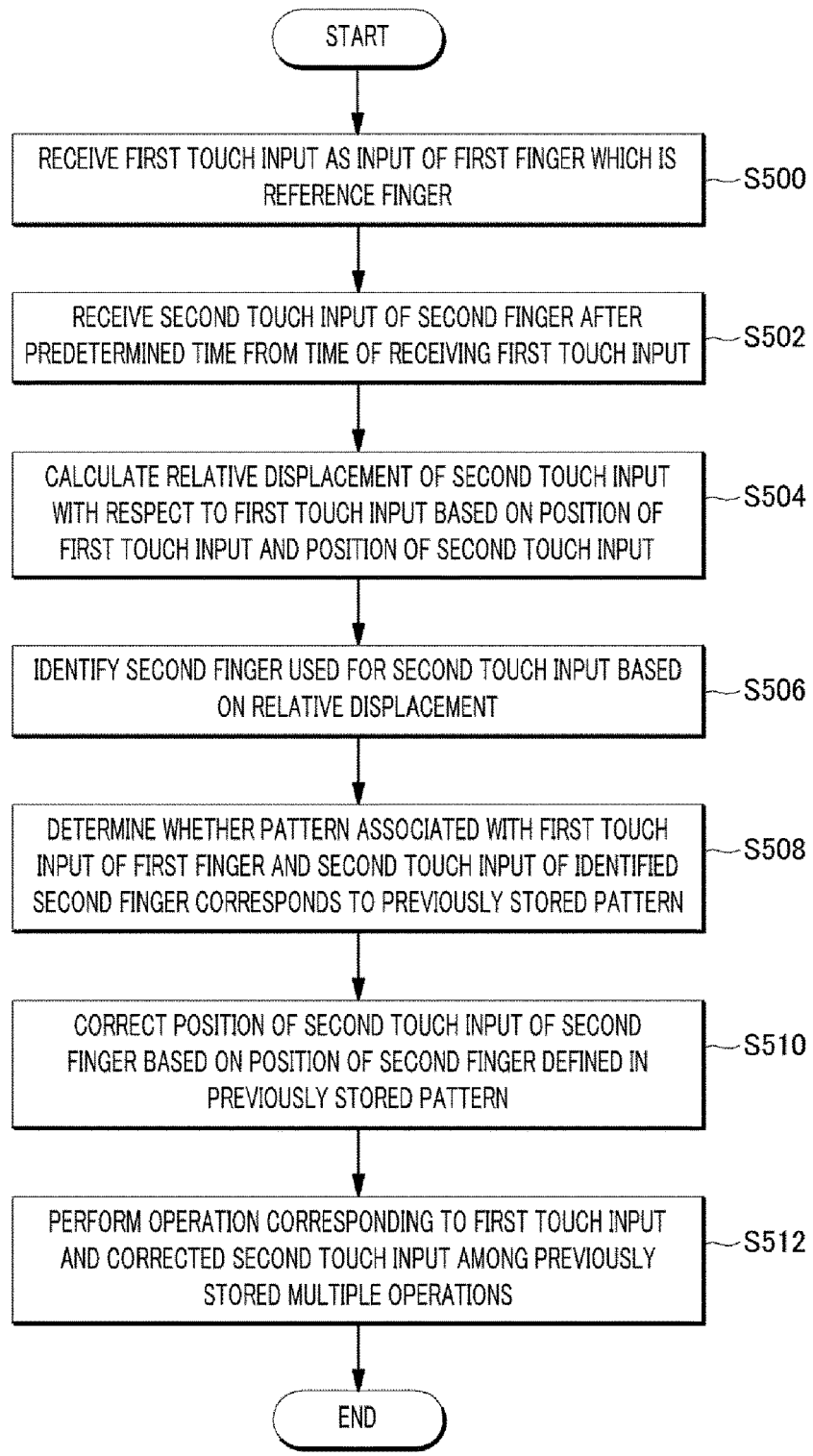
FIG. 5 is a flowchart showing a touch input method for a mobile device according to an embodiment of the present disclosure.

FIG. 5 is a flowchart showing a touch input method for a mobile device according to an embodiment of the present disclosure. The touch input method for a mobile device according to the embodiment illustrated in FIG. 5 includes the processes time-sequentially performed by the mobile device illustrated in FIG. 1. Therefore, descriptions of the processes performed by the mobile device may be applied to the touch input method for a mobile device performed according to the embodiment illustrated in FIG. 5, even though they are omitted hereinafter.

Referring to FIG. 5, the mobile device 100 may receive a first touch input as an input of a first finger which is a reference finger in S500.

The mobile device 100 may receive a second touch input in S502.

The mobile device 100 may calculate a relative displacement of the second touch input with respect to the first touch input on the basis of a position of the first touch input and a position of the second touch input in S504.

The mobile device 100 may identify a second finger used for the second touch input on the basis of the relative displacement in S506.

The mobile device 100 may determine whether a pattern associated with the first touch input of the first finger and the second touch input of the identified second finger corresponds to a previously stored pattern in S508.

If the pattern corresponds to the previously stored pattern, the mobile device 100 may correct the position of the second touch input of the second finger on the basis of a position of the second finger defined in the previously stored pattern in S510.

The mobile device 100 may perform an operation corresponding to the touch inputs of the first finger and the identified second finger among previously stored multiple operations in S512.

The touch input method for the mobile device as described through FIG. 5 can be embodied in a storage medium including instruction codes executable by a computer or processor such as a program module executed by the computer or processor. A computer readable medium can be any usable medium which can be accessed by the computer and includes all volatile/nonvolatile and removable/non-removable media. Further, the computer readable medium may include computer storage medium. The computer storage medium includes all volatile/nonvolatile and removable/non-removable media embodied by a certain method or technology for storing information such as computer readable instruction code, a data structure, a program module or other data.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

EXPLANATION OF CODES

100: Mobile device

I claim:

1. A touch input method for a mobile device, comprising:
receiving a first touch input as an input of a first finger which is a reference finger;
receiving a second touch input of a second finger after a predetermined time from a time of receiving the first touch input;
calculating a relative displacement of the second touch input with respect to the first touch input on the basis of a position of the first touch input and a position of the second touch input;
identifying the second finger used for the second touch input on the basis of the relative displacement;
determining whether a pattern associated with the first touch input of the first finger and the second touch input of the identified second finger corresponds to a previously stored pattern;
correcting the position of the second touch input of the second finger on the basis of a position of the second finger defined in the previously stored pattern when the pattern corresponds to the previously stored pattern; and
performing an operation corresponding to the first touch input and the corrected second touch input among previously stored multiple operations.

2. The touch input method of claim 1,
wherein in the identifying of the second finger used for the second touch input on the basis of the relative displacement, when the relative displacement of the second touch input with respect to the first touch input is equal to or smaller than a predetermined value, it is determined that the second finger is the same as the first finger, and
when the relative displacement of the second touch input with respect to the first touch input is greater than the predetermined value, it is determined that the second finger is different from the first finger.

3. The touch input method of claim 2,
wherein the correcting of the position of the second touch input of the second finger comprises if it is determined that the second finger is the same as the first finger, correcting the position of the second touch input on the basis of the position of the first touch input.

4. The touch input method of claim 1, further comprising:
receiving a third touch input; and
calculating a relative displacement of the third touch input with respect to the first touch input and a relative displacement of the third touch input with respect to the second touch input on the basis of the position of the first touch input, the position of the second touch input, and a position of the third touch input.

5. The touch input method of claim 4, further comprising:
identifying a third finger used for the third touch input on the basis of the relative displacement of the third touch input with respect to the first touch input and the relative displacement of the third touch input with respect to the second touch input.

6. The touch input method of claim 5, further comprising:
performing an operation corresponding to the touch inputs of the first finger, the second finger, and the third finger among the previously stored multiple operations.

7. The touch input method of claim 5,
wherein in the identifying of the third finger used for the third touch input, when the relative displacement of the third touch input with respect to the first touch input is equal to or smaller than a predetermined value, it is determined that the third finger is the same as the first finger,
when the relative displacement of the third touch input with respect to the second touch input is equal to or smaller than a predetermined value, it is determined that the third finger is the same as the second finger, and
when the relative displacement of the third touch input with respect to the second touch input is greater than a predetermined value, it is determined that the third finger is different from the second finger.

8. The touch input method of claim 6,
wherein the performing of the operation corresponding to the touch inputs of the first finger, the second finger, and the third finger among the previously stored multiple operations comprises if it is determined that the third finger is the same as the first finger, correcting the position of the third touch input on the basis of the position of the first touch input, and
if it is determined that the third finger is the same as the second finger, correcting the position of the third touch input on the basis of the position of the second touch input.

9. The touch input method of claim 6,
wherein the performing of the operation corresponding to the touch inputs of the first finger, the second finger, and the third finger among the previously stored multiple operations comprises if it is determined that the third finger is different from the second finger, correcting the position of the third touch input on the basis of a previously stored pattern.

10. The touch input method of claim 1, further comprising:
identifying which hand makes the first touch input on the basis of at least one of an orientation angle of the mobile device, the position of the first touch input, a shape of the first touch input, and a relative positional relationship among multiple touch inputs.

11. The touch input method of claim 1, further comprising:
checking whether a predetermined time has elapsed after the second touch input; and
receiving a touch input after elapse of the predetermined time as an input of the first finger which is the reference finger.

12. The touch input method of claim 1, further comprising:
receiving one of previously stored multiple touch inputs; and
determining the reference finger on the basis of the received touch input.

13. The touch input method of claim 1, further comprising:
providing feedback about the touch inputs of the first finger and the identified second finger.

14. A mobile device, comprising:
a touch input receiving unit configured to receive a first touch input as an input of a first finger which is a reference finger and receive a second touch input of a second finger after a predetermined time from a time of receiving the first touch input;
a touch input analyzing unit configured to calculate a relative displacement of the second touch input with respect to the first touch input on the basis of a position of the first touch input and a position of the second touch input;
a finger identifying unit configured to identify the second finger used for the second touch input on the basis of the relative displacement;
a pattern analyzing unit configured to determine whether a pattern associated with the first touch input of the first finger and the second touch input of the identified second finger corresponds to a previously stored pattern;
a touch input position correcting unit configured to correct the position of the second touch input of the second finger on the basis of a position of the second finger defined in the previously stored pattern when the pattern corresponds to the previously stored pattern; and
an output unit configured to perform an operation corresponding to the first touch input and the corrected second touch input among previously stored multiple operations.

15. The mobile device of claim 14, further comprising:
a counter unit configured to check whether a predetermined time has elapsed after the second touch input.

16. The mobile device of claim 14, further comprising:
a reference finger determining unit configured to receive one of previously stored multiple touch inputs and determine the reference finger on the basis of the received touch input.

17. A computer program stored in a medium that is linked to a computing device and configured to identify a touch input,
wherein when the computer program is executed by the computing device,
the computer program stored in the medium including a sequence of commands enables:
receiving a first touch input as an input of a first finger which is a reference finger,
receiving a second touch input of a second finger after a predetermined time from a time of receiving the first touch input,
calculating a relative displacement of the second touch input with respect to the first touch input on the basis of a position of the first touch input and a position of the second touch input,
identifying the second finger used for the second touch input on the basis of the relative displacement,
determining whether a pattern associated with the first touch input of the first finger and the second touch input of the identified second finger corresponds to a previously stored pattern,
correcting the position of the second touch input of the second finger on the basis of a position of the second finger defined in the previously stored pattern when the pattern corresponds to the previously stored pattern, and
performing an operation corresponding to the first touch input and the corrected second touch input among previously stored multiple operations.

* * * * *